United States Patent
Bhatia

[19]

[11] Patent Number: 5,930,699
[45] Date of Patent: Jul. 27, 1999

[54] ADDRESS RETRIEVAL SYSTEM

[75] Inventor: Ranjit Bhatia, Dallas, Tex.

[73] Assignee: Ericsson Inc., Research Triangle Park, N.C.

[21] Appl. No.: 08/747,464

[22] Filed: Nov. 12, 1996

[51] Int. Cl.[6] .............................. H04M 3/42; H04Q 7/20
[52] U.S. Cl. ..................... 455/414; 455/456; 455/433
[58] Field of Search ............................. 455/414, 426, 455/433, 456, 457

[56] References Cited

U.S. PATENT DOCUMENTS

| | | | |
|---|---|---|---|
| 5,517,555 | 5/1996 | Amadon et al. | 455/408 |
| 5,561,704 | 10/1996 | Salimando | 455/456 |
| 5,727,057 | 3/1998 | Emery et al. | 455/456 |
| 5,760,742 | 6/1998 | Branch et al. | 455/456 |
| 5,774,803 | 6/1998 | Kariya | 455/414 |
| 5,797,091 | 8/1998 | Clise et al. | 455/456 |

FOREIGN PATENT DOCUMENTS

| | | |
|---|---|---|
| 0 647 076 A1 | 4/1995 | European Pat. Off. . |
| WO 93/01665 | 1/1993 | WIPO . |
| WO 96/28945 | 9/1996 | WIPO . |
| WO 96/36193 | 11/1996 | WIPO . |

*Primary Examiner*—Willis R. Wolfe
*Attorney, Agent, or Firm*—Jenkens & Gilchrist, P.C.

[57] ABSTRACT

A method and apparatus for enabling a user to request location information from a mobile station telephone unit is disclosed. A user enters a request for location information concerning a particular type of business. The request is processed by a module within the mobile station and transmitted to the home location register for the mobile station via the base station and mobile switching center serving the mobile station. The home location register determines the location area and cell identity for the mobile station and transmits this information plus the original request to a relational database. The relational database determines the identity of businesses located either within or near the location area and/or cell identity of the mobile station. This information and the addresses of the identified business is transmitted back to the mobile station for review by the user.

21 Claims, 3 Drawing Sheets

FIG. 3

| | CGI | LA | RESTAURANTS | ADDRESS |
|---|---|---|---|---|
| | XXX | YYYY | PIZZA HUT | 123 ROSS |
| | XXX | YYYY | TOM'S FISH | 456 BAY STREET |
| | XXX | YYYY | BOB'S BARBEQUE | 789 ELM |

ADDRESS RETRIEVAL SYSTEM

BACKGROUND OF THE INVENTION

1. Technical Field of the Invention

The present invention relates to personal communication systems, and more particularly, to the use of mobile stations for retrieving local address information.

2. Description of Related Art

A classic problem with mobile subscribers traveling in unfamiliar areas arises from the subscriber needing to find a particular business or facility within the unfamiliar area. For example, if one is traveling from California to New York and are located in the middle of Kansas and wish to have dinner or purchase gas, the subscriber does not know where these services may exist.

Presently, existing systems for providing address type information, include global positioning systems (GPS) which provide a user with their position and the location of preprogrammed sites in relation to the user's position. While this type of system can be very useful, it is very expensive. Furthermore, sites which have not been preprogrammed into the user's GPS unit are not available to the user. Thus, a system operating through the mobile station of a cellular telephone system would provide valuable information to a mobile subscriber.

SUMMARY OF THE INVENTION

The present invention overcomes the foregoing and other problems with a method and apparatus for providing a mobile station subscriber with the ability to request address information for a particular type of business such as a restaurant, gas station, dry cleaner, etc. The mobile station includes a module responsive to user input through the user interface of a mobile station for generating a request for location information about a particular type of business. This request is transmitted to a mobile switching center (MSC) serving the mobile station, and the request is forwarded to the home location register (HLR) for the mobile station.

The home location register determines the location area (LA) and/or the cell global identity (CGI) from which the mobile station is transmitting. This location data for the mobile station and the request are forwarded to a database located remotely from or in conjunction with the home location register. In response to the request and the location data provided by the home location register, the database locates address information for each of the requested business types located within the location area and/or cell global identity area of the mobile station. This information is forwarded to the mobile station where the information can be viewed by the user.

BRIEF DESCRIPTION OF THE DRAWINGS

For a more complete understanding of the present invention, reference is made to the following detailed description taken in conjunction with the accompanying drawings wherein:

FIG. 3 illustrates the structure of the database containing address and location data information.

DETAILED DESCRIPTION OF THE DRAWINGS

Figure 1:
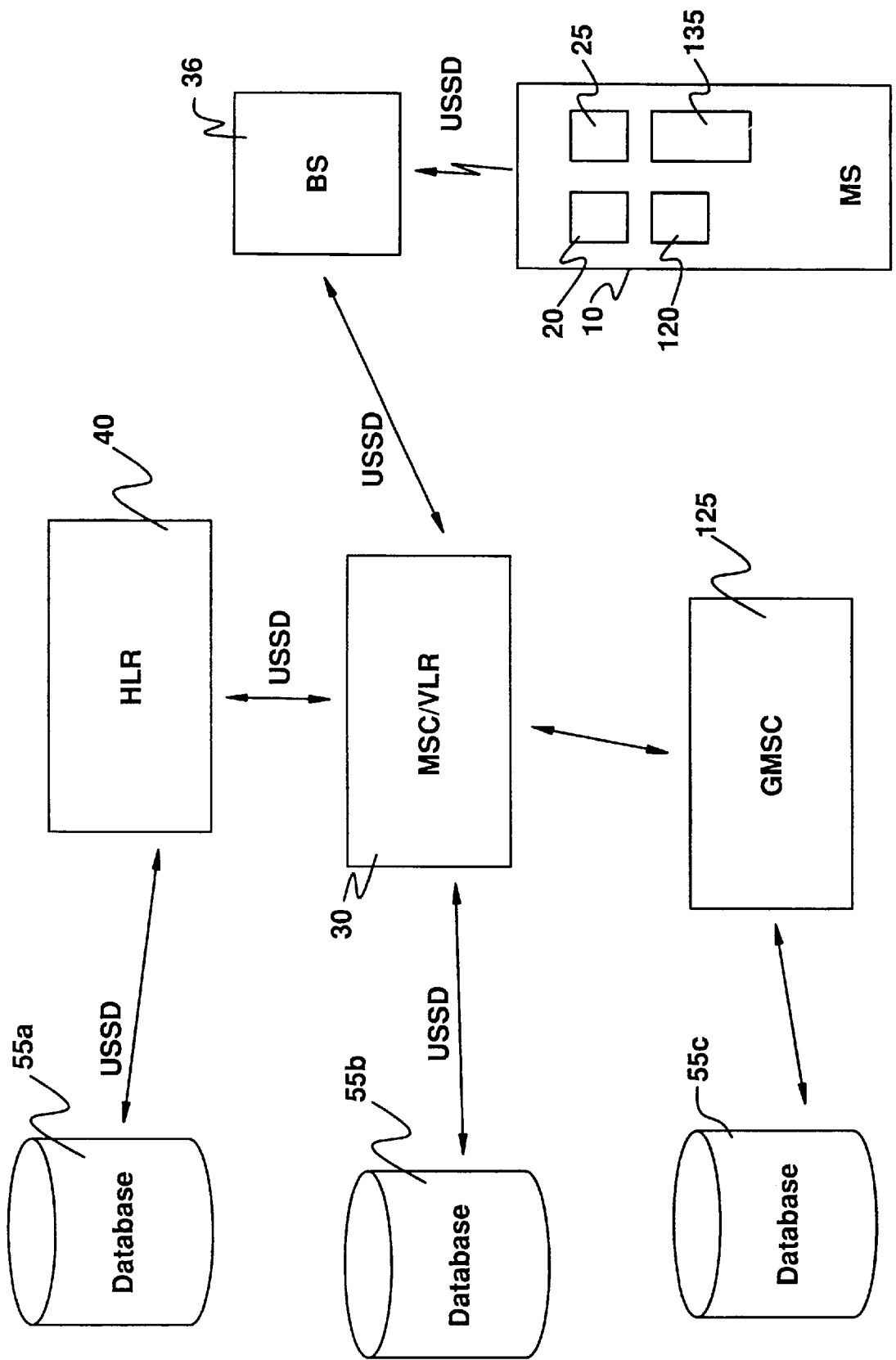
FIG. 1 is a block diagram illustrating the manner in which a mobile station requests address information from a database.
Figure 2:
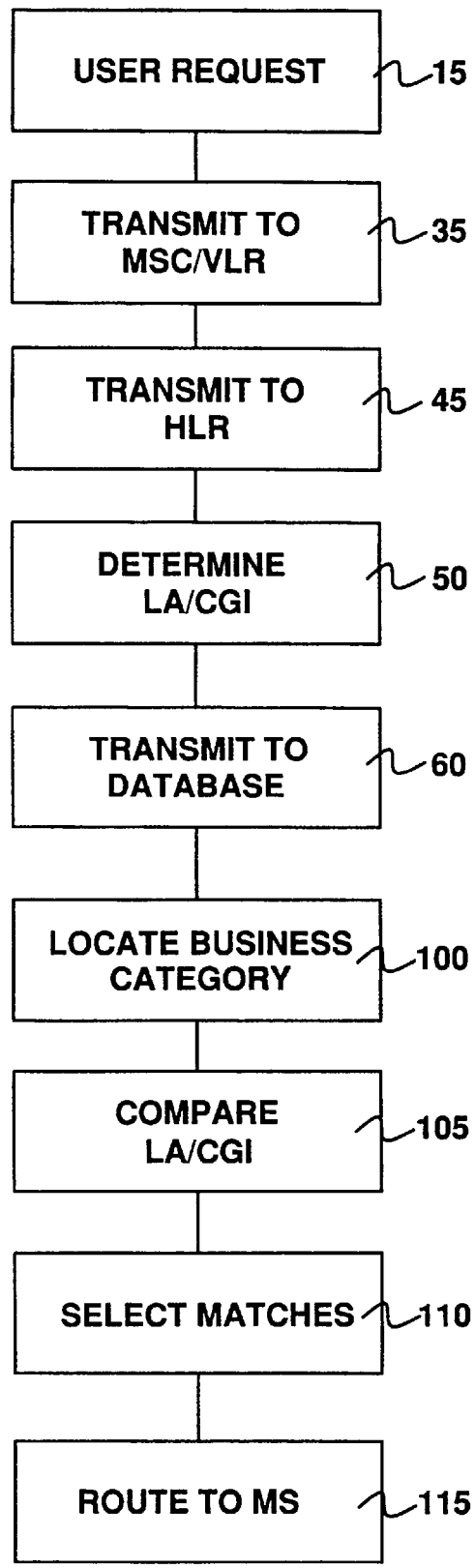
FIG. 2 is a flow chart illustrating the method for the mobile station to request address information from a database.

Referring now to the Drawings, and more particularly to FIGS. 1 and 2, there is illustrated a block diagram of the components of the present invention and a flow diagram illustrating the operation of the present invention. Initially, a user at a mobile station 10 request at step 15 information concerning the nearest location of a particular type of business, for example, a restaurant, gas station or movie theater. This information is entered into a user module 20 through the user interface 25 of the mobile station 10.

The user module 20 formats the request into a unstructured supplementary service data (USSD) message for transmission to the mobile switching center/visitor location register (MSC/VLR) 30 via the base station 36. While the following description is made with respect to use of the USSD message protocol, it is to be understood that any message protocol may be utilized. The USSD protocol is used for non-standard data for which there is no structured way to communicate the data between the MSC/VLR 30 and the mobile station 10. USSD messages enable user interaction between public land mobile network (PLMN) applications and a mobile station in a transparent manner through a mobile telecommunications network. The communication is transparent because no review or manipulation of the contents of the message is performed during the transportation period.

After the request, encoded as a USSD message, has been transmitted from the base station 36 to the MSC/VLR 30 at step 35, the request is transmitted to the home location register (HLR) 40 for the mobile station 10 at step 45. The HLR 40 processes the request from the mobile station 10 and determines at step 50 the present location area (LA) and/or cell global identity (CGI) for the mobile station 10. Location areas are subgroups of the total area covered by each MSC/VLR 30. The location area comprises an area in which a mobile station 10 may move freely without updating location information to the MSC/VLR 30. A cell global identity is a sub-unit of a location area and defines the particular cell within which the mobile station 10 is located. Once the location area/cell global identity information is determined, this data plus the original request are transmitted to a relational database 55 at step 60. The request and location data are transmitted from the HLR to the relational database 55 using USSD messages.

Referring now also to FIG. 3, there is illustrated the structure of the relational database 55. Each of the member entries 65 are categorized under a particular business classification category 70. The illustration of FIG. 3 describes a business classification category 70 of restaurants. Other examples would include theaters, gas stations, malls, bowling alleys, etc. For each member entry 65 there is associated therewith the cell group identity 75 and location area 80 within which the business member entry is located. An address entry 85 indicates the physical street address for the member entry 65.

Once the database 55 receives the request and location data information from the HLR 40, the particular business classification category 70 included in the request is located at step 100. Next, the cell group identity 75 and/or location area 80 information for the mobile station 10 is compared at step 105 to the CGI and LA information for the selected business classification category 70. The database 55 then selects at step 110 those member entries 65 of the selected business classification category 70 having either the same or substantially the same CGI and/or LA as the requesting mobile station 10. Thus, a user at a mobile station 10 may locate restaurants within their particular location area or cell area, or of restaurants within adjacent location areas or cell areas.

Next, the addresses for the selected member entries 65 are converted into USSD messages for transmission at step 115 back to the mobile station 10. Transmission back to the mobile station 10 occurs back through the HLR 40, MSC/VLR 30 and BS 35. The received USSD message is processed by the user module 20 and the address information is displayed via a user display 120.

FIG. 1 further illustrates a second pathway between the mobile station 10 and a database 55b wherein the database is connected directly to the MSC/VLR 30. In this configuration the MSC/VLR 30 would determine the present location area (LA) and/or cell global identity for the mobile station 10. This information would then be used to locate the member entries 65 most closely located with the mobile station in the manner discussed above.

FIG. 1 illustrates yet a third pathway wherein the database 55c is located outside of the public land mobile network through a gateway mobile switching center (GMSC) 125. The HLR 40 or MSC/VLR 30 would extract the location area for the mobile station 10 as described previously and forward the information to the database 55c through the GMSC 125. The address data is transmitted back to the mobile station through the gateway 125.

In another embodiment of the present invention, all messages between the mobile station 10 and the relational database 55 can be transmitted through the public land mobile network using short message service (SMS) protocol. In this embodiment, the user module 20 merely encapsulates the request for location information into a SMS message and transmits the message through a control and data channel such as a stand alone dedicated control channel (SDCCH). Transmission of the request and address data occurs in the same manner as that described previously for USSD messages. After receiving the SMS message containing the address data from the relational database 55, the mobile station 10 passes the data to an attached subscriber identity modular (SIM) card 135 and the SIM card stores the received data into an internal buffer or memory register. This message may then be accessed by the user.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for providing a mobile station in a cellular telephone network access to location information for a selected business class, comprising the steps of:

defining a database containing members of a selected business class, each member of the selected business class having location data defining a sector of the cellular telephone network associated therewith;

receiving at a central location a user request for location information for the selected business class from a mobile station;

determining location data identifying a sector of the cellular telephone network associated with a present location for the mobile station;

locating within the database members of the selected business class located within substantially the same sector of the cellular telephone network as the mobile station; and forwarding location information for the located members of the selected business class to the requesting mobile station.

2. The method of claim 1 wherein the sector of the cellular telephone network comprises a location area of the mobile station.

3. The method of claim 1 wherein the sector of the cellular telephone network comprises a cell global identity of the mobile station.

4. The method of claim 1 further including the step of transmitting a request from the mobile station to the central location using an unstructured supplementary service data message.

5. The method of claim 1 further including the step of transmitting a request from the mobile station to the central location using a short message service message.

6. The method of claim 1 wherein the central location comprises a home location register.

7. The method of claim 6 wherein the step of forwarding further comprises the steps of forwarding the located members from a database to the home location register to a mobile switching center to a mobile station.

8. The method of claim 1 wherein the step of determining utilizes a relational database including listings for a plurality of members of a plurality of business classes, each member having associated location information, and location data.

9. The method of claim 1 wherein the central location comprises a visitor location register.

10. A system enabling a user to obtain location information for a selected business class from a mobile station of a cellular telephone system, comprising:

means located within the mobile station enabling the user to generate a request for location information for a selected business class;

means for determining at least one of a location area and a cell global identity where the mobile station is currently located in response to the request for location information; and a database responsive to the determined at least one location area and cell global identity and the request for location information for providing location information for members of the selected business class having substantially the same determined at least one location area and cell global identity as the mobile station.

11. The system of claim 10 wherein the means located within the mobile station and the database are interconnected via a communications link using unstructured supplementary service data messages.

12. The system of claim 10 wherein the means located within the mobile station and the database are interconnected via a communications link using short message service data messages.

13. The system of claim 10 wherein the means for determining comprises a home location register for the mobile station.

14. The system of claim 10 wherein the database comprises a relational database having a plurality of members for a plurality of business classes, each of the plurality of members having associated location data and location information.

15. The system of claim 10 wherein the means for enabling a user request is responsive to commands entered through a user interface of the mobile station.

16. The system of claim 10 wherein the means for determining comprises a visitor location register.

17. The system of claim 10 wherein the database is located outside of a public land mobile network within which the mobile station operates.

18. A system enabling a user to obtain location information for a selected business class from a mobile station of a cellular telephone system, comprising:

a user module located within the mobile station enabling the user to transmit a request for location information to a central location via a communications link using unstructured supplementary service data protocol;

means within the central location for determining a sector of the cellular telephone system where the mobile station is presently located in response to the request for location information; and a relational database including a plurality of members for a plurality of business classes for providing location information for members of the selected business class located substantially within the same sector of the cellular telephone system as the mobile station, each of the plurality of members having associated sector of the cellular telephone system and location information.

19. The system of claim 18 wherein the means for determining comprises a home location register for the mobile station.

20. The system of claim 18 wherein the sector of the cellular telephone system comprises a location area identifier.

21. The system of claim 18 wherein the sector of the cellular telephone system comprises a cell global identity identifier.

* * * * *